Aug. 2, 1960     H. A. ARNOLD ET AL     2,947,087
EDUCATIONAL, RECREATIONAL, AND TESTING APPARATUS
Filed March 18, 1957     3 Sheets-Sheet 1

INVENTORS
John B. Sharp.
Harold A. Arnold.
BY Cameron, Kerkam & Sutton
ATTORNEYS Aug. 2, 1960 H. A. ARNOLD ET AL 2,947,087
EDUCATIONAL, RECREATIONAL, AND TESTING APPARATUS
Filed March 18, 1957 3 Sheets-Sheet 2

INVENTORS
John B. Sharp
Harold A. Arnold
BY
Cameron, Kerkam & Sutton
ATTORNEYS

Aug. 2, 1960    H. A. ARNOLD ET AL    2,947,087
EDUCATIONAL, RECREATIONAL, AND TESTING APPARATUS
Filed March 18, 1957    3 Sheets-Sheet 3

INVENTORS
John B. Sharp.
Harold A. Arnold.
BY Cameron, Kerkam & Sutton
ATTORNEYS United States Patent Office 2,947,087
Patented Aug. 2, 1960

2,947,087

EDUCATIONAL, RECREATIONAL, AND TESTING APPARATUS

Harold A. Arnold and John B. Sharp, Knoxville, Tenn.; Icesy Hayes Arnold, as administratrix of the estate of Harold A. Arnold, deceased, assignors to The University of Tennessee Research Corporation, Knoxville, Tenn., a corporation of Tennessee Filed Mar. 18, 1957, Ser. No. 646,586

6 Claims. (Cl. 35—9)

This invention relates to apparatus which may be used in teaching, which may be used for testing of students, and which may be used for recreational purposes wherein the user of the apparatus seeks to provide correct information in a field of education or knowledge about items displayed in association with the apparatus.

More particularly this invention relates to such apparatus used in conjunction with numbered or identified objects, items, or displays in a field of instruction or knowledge in which the user of the apparatus first sets off on a selector the indicia associated with the object item or display to be considered and then actuates mechanism associated with what the user of the apparatus considers to be the correct information with respect to the item, display or object. If the selection made by the user of the apparatus is correct his correct selection may be signaled by the flashing of a light, the sounding of a bell, or the like, and when the apparatus is being utilized for testing purposes counting apparatus may be actuated to keep a record of correct selections or of wrong selections so that a score may be obtained.

Educational, testing and recreational apparatus of this general type have heretofore been suggested in the art as will be found in Patent No. 1,860,895 to Marx of May 31, 1932; No. 2,104,718 to Dougherty of January 4, 1938; and No. 2,275,988 to Parker of March 10, 1942. The apparatus of the present invention has advantages over those of the prior art in ease of construction, compactness, long life, low maintenance, and in the fact that the present apparatus is physically self-sufficient and may be used in all fields of education and testing without change to its basic structure and without the need of physical connection to the subject matter with which the apparatus is to be employed.

It is accordingly an object of the present invention to provide novel educational, recreational, and testing apparatus of improved and simplified construction which is relatively cheap and easy to make and to maintain.

Another object is to provide such apparatus for multipurpose teaching, testing and recreation which may be used with pictures, graphs, charts, maps, physical specimens, and similar media.

Another object is to provide such apparatus which may be used in any field of teaching without change to its basic construction by the simple changing of the subject matter used with the apparatus.

Another object is to provide such apparatus which may be employed for industrial or commercial advertising by a suitable selection of material with which the apparatus is employed.

Other and further objects of the present invention will appear from the following description of an illustrative embodiment thereof.

The apparatus of the present invention is capable of various embodiments and may be actuated mechanically, pneumatically, hydraulically or electrically within the scope of the invention. For purposes of illustration embodiments of the present invention actuated electrically will be described hereinafter to illustrate the same. These illustrative embodiments of the invention should in no way be construed as defining or limiting the same and reference should be had to the appended claims to determine the scope of the invention.

In the accompanying drawings, in which like reference characters indicate like parts, Fig. 1 is a view of an illustrative embodiment of the present invention set up for teaching and testing in the field of forestry and showing the general arrangement of the several parts thereof;

As pointed above, the apparatus of the present invention may be used in all fields of teaching and testing when selected objects, items or displays in any given field of knowledge or teaching are associated with the apparatus and each such object or physical specimen is given suitable identifying indicia. In the illustrative embodiment of Fig. 1 the apparatus is set up for teaching and testing in the field of forestry and various physical specimens in this field are arranged about the apparatus and each specimen is given an identifying number. A suitable correlating medium is manually operable to close one of a plurality of switches and each position of this correlating medium is given a number to correspond to a numbered specimen. A plurality of manually actuable push button type switches are connected in circuit with the correlating medium and this circuit may include a red light, a green light and a chime. A description of one of the specimens is placed opposite each of the push button type switches and the circuits are arranged, as will be described in more detail below with respect to Fig. 2, so that if the proper push button switch is closed by the user of the apparatus correctly identifying the specimen set off on the correlating medium a green light will show and the chime will sound. If an incorrect push button is closed incorrectly identifying the specimen the red light will show indicating that the user of the apparatus is in error in selecting the designation or description of the specimen.

Figures 1, 2:
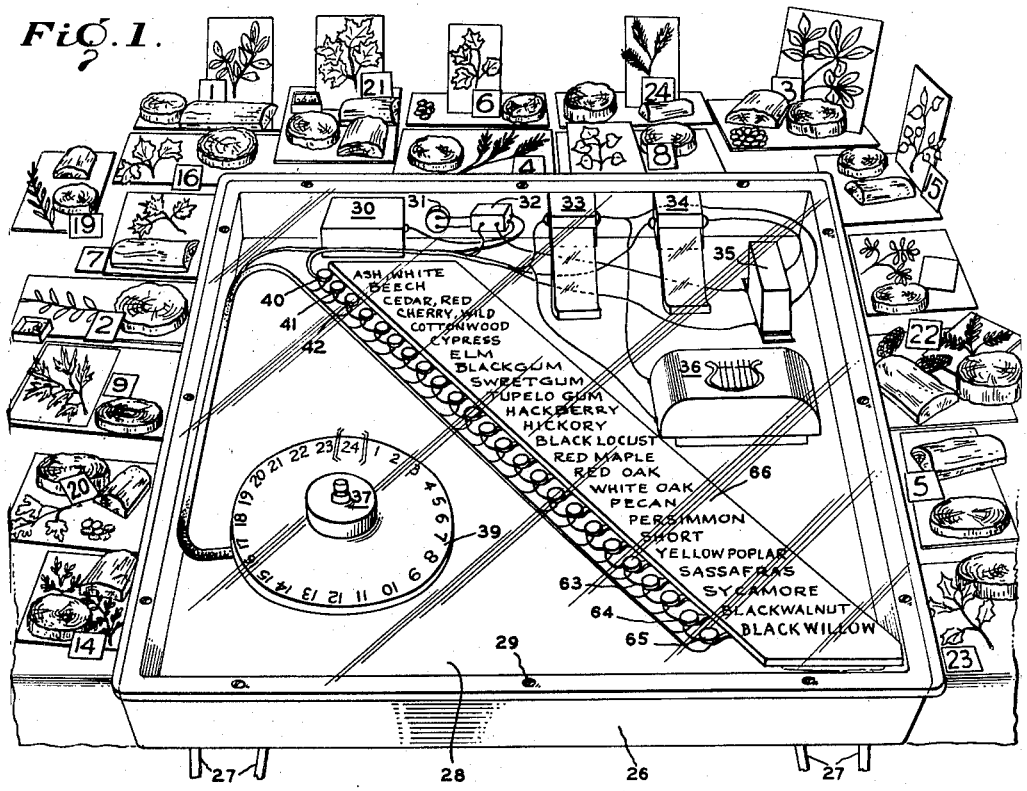
Fig. 2 is a wiring diagram suitable for use with the embodiment of Fig. 1.

Thus, for example, if the user of the apparatus is to identify Exhibit No. 24 the correlating medium, shown in Fig. 1 as a manually actuable rotary switch, is rotated until the number 24 comes opposite an index point. The user of the apparatus then actuates the push button switch opposite the descriptive matter which the user believes correctly identifies or describes specimen No. 24. If, for example, specimen 24 is red cedar and if the user of the apparatus closes the push button switch opposite the designation "cedar, red" then an electric circuit will be completed to the green light and to the chime to indicate a correct answer. If, on the other hand, a wrong selection is made by closing any of the other push button switches then the red light will show to indicate a wrong answer.

Referring now more particularly to Figs. 1 and 2, specimens taken from the field of forestry and to be identified are each given a reference number such numbers selected in the range of from 1 to 24, inclusive. These specimens are suitably arranged at random about a housing 26 for the apparatus of the present invention and housing 26 may be provided with suitable legs 27. Housing 26 is covered by a transparent top 28 which is suitably secured thereto as by screws 29. Top 28 may be made of glass, Plexiglas or the like. Within housing 26 and under top 28 are mounted a transformer 30, an electric lead in 31, a power switch 32, a green light 33, a red light 34, a relay 35, and a chime 36. A manually operable rotary selector switch 37 is mounted on top 28 and is provided with a number of contacts corresponding to the number of specimens and the dial of 39 thereof is numbered in sequence with each number thereon corresponding to one of the switch contacts. A plurality of push button type switches indicated at 40–65, inclusive, are mounted in a diagonal line across top 28 and each of switches 40–65 are provided with a unit of replaceable descriptive matter adjacent thereto describing one of the specimens 1–24, such descriptive material being generally indicated at 66.

These several electrical elements are connected into the circuit shown in Fig. 2. Electric leads 31 are connected to the primary windings 67 of transformer 30 and the secondary windings 68 thereof are connected to one side 69 of double pole switch 70. The other side of 71 of switch 70 is connected to a battery 72 which may be used when it is inconvenient to use an outside source of electricity. Switch 70 is provided with a manually actuable contact 73 one side of which is connected to wire 74 and the other side is connected to wire 75. Wire 74 is connected to one side of coil 76 of relay 35 and the other side of coil 76 is connected by wire 77 to rotary contact 78 of selector switch 37. Wire 74 is connected to wire 79 which connects to one side of red light 34 and the other side of light 34 is connected by wire 80 to one contact 81 of relay 35. Chime 36 is connected by wire 82 to wire 79 and by wire 83 to wire 84 which connects to the other contact 85 of relay 35, relay 35 having a moveable switch element 86. Green light 33 is connected to wire 79 by wire 87 and to wire 84 by wire 88. Switch element 86 is connected by wire 89 to a buss wire 90 which is connected to one side of each of push button switches 40–65.

Wire 75 is connected to buss wire 91 which is connected to each of other sides of push button switches 40–65. Each push button switch 40–65 is provided with a third contact each of which is connected as by wires 92–115, respectively, to one of the contacts 116–139 of selector switch 37.

Assuming that contact 73 is in contact with side 69 of switch 70, it will be noted that red light 34 will be energized by closing any one of the switches 40–65 unless the switch of switches 40–65 which is closed designates a correct answer. The circuit to red light 34 is from transformer secondary 68 through wire 75 and buss wire 91 through the closed switch of switches 40–65 and thence to buss wire 90 and wire 89 to switch element 86, contact 81, wire 80, red light 34, wire 79 and wire 74 back to secondary 68.

If the push button switch actuated is that for the correct designation of the specimen, not only is the just described circuit through the red light 34 completed, but the circuit through the appropriate one of wires 92–115, the appropriate one of contacts 116–139, through contact 78, and through wire 77 is completed to coil 76 which energizes relay 35 moving switch element 86 to contact 85 breaking the circuit to red light 34 and completing the circuit to green light 33 and chime 36. The circuit to green light 33 and chime 36 is then from secondary 68 to wire 75, buss wire 91, the appropriate push button switch 40–65, buss wire 90, wire 89, switch element 86, contact 85, wire 84, wires 83 and 88 to chime 36 and green light 33, respectively, wires 82 and 87 from chime 36 and green light 33, respectively, to wire 79, from wire 79 to wire 74 and back to secondary 68. As soon as the selected push button switch 40–65 is released this circuit is broken and relay 35 returns to its normal position with switch element 86 in engagement with contact 81.

When score is to be kept the apparatus of Figs. 1 and 2 may be modified to include an electrically actuated counting device and circuits for the counting device, the wiring of such circuits depending upon the counting of correct answers or the counting of errors.

Figure 3:
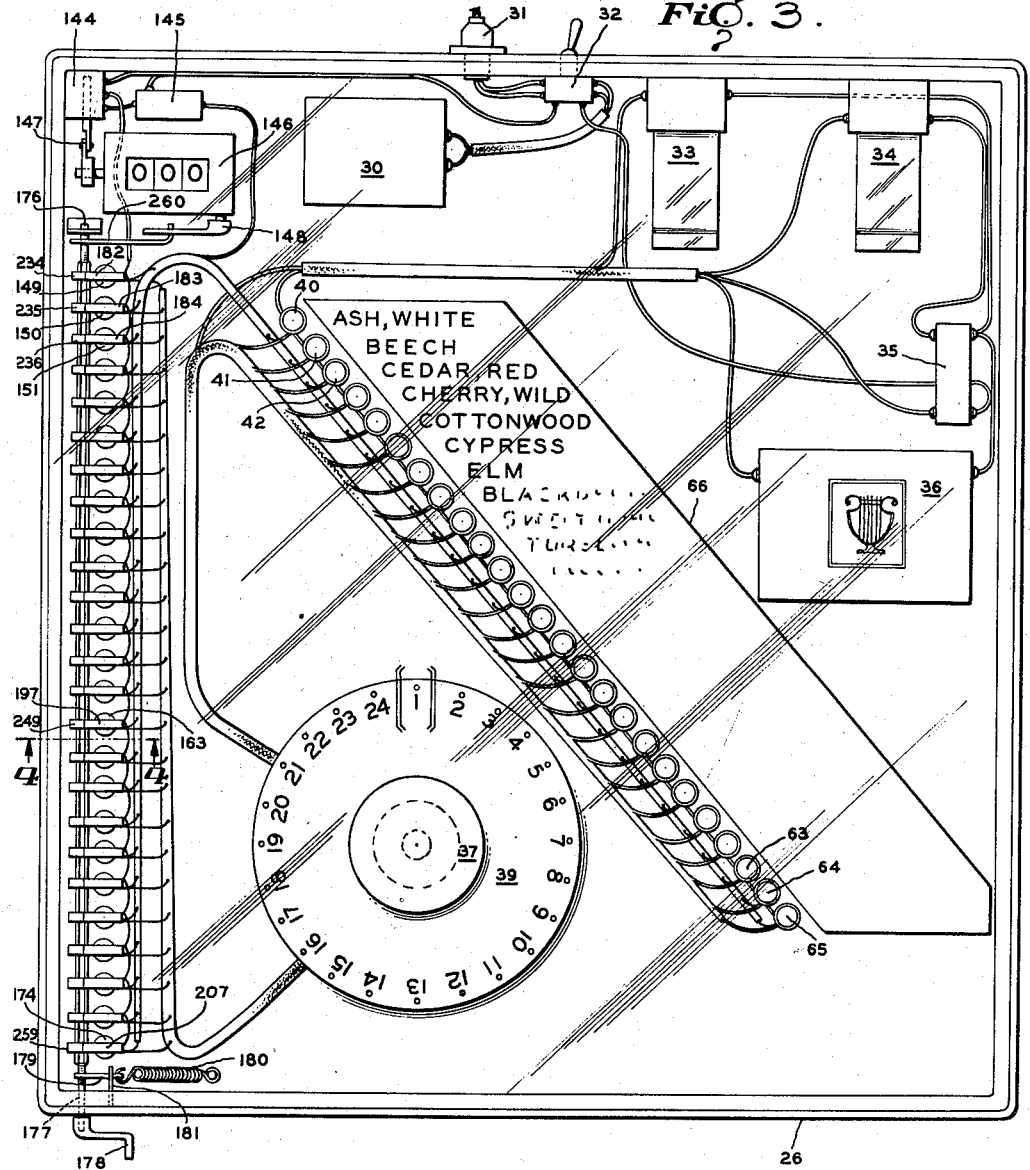
Fig. 3 is a view from above of the embodiment of Fig. 1 including a score counting mechanism.
Figure 5:
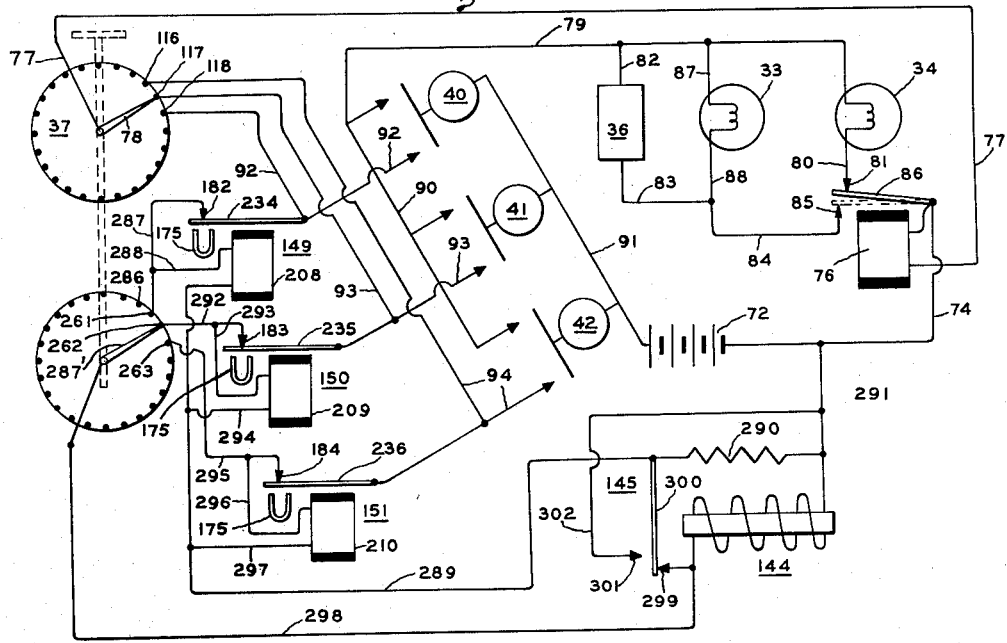
Fig. 5 is a wiring diagram for use with the embodiment of Fig. 3 when correct scores are to be counted.
Figure 6:
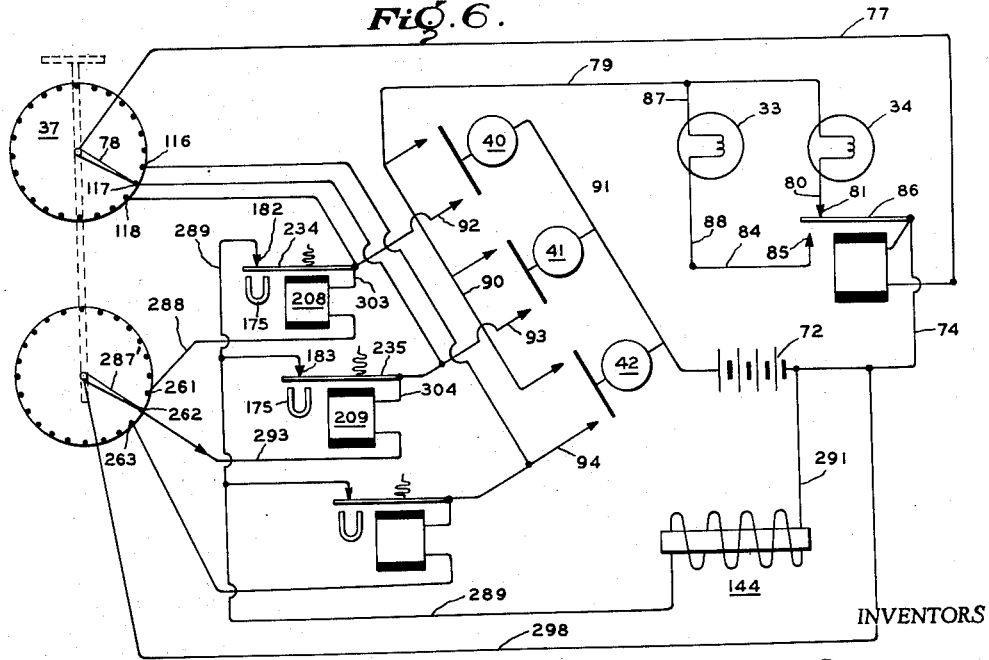
Fig. 6 is a wiring diagram of the embodiment of Fig. 3 when incorrect scores are to be counted.

Fig. 3 shows a counting mechanism incorporated with the apparatus of Fig. 1. Fig. 5 is a circuit for use with apparatus to count correct answers and Fig. 6 is a circuit for use when errors are to be counted. In both cases selector switch 37 is provided with a set of contacts additional to contacts 116–139 as will appear more fully hereinafter.

Referring to Fig. 3, the counting mechanism includes a counter actuating solenoid 144, a counter relay 145, a suitable counter 146 connected to the moveable core of solenoid 144 by linkage 147, counter 146 having a re-set arm 148. A separate relay is provided for each of push button switches 40–65 and these relays are shown at 149–174 arranged in line and provided with a common U-shaped permanent magnet 175 (Fig. 4) to hold the armatures 249 of the relays 149–174. Magnet 175 is mounted for rotation about its long axis at 176 and at 177 and is provided with an operating handle 178; with an arm 179; with a spring 180 and with a stop 181 to return magnet 175 to its normal position with its poles upwardly.

Figure 4:
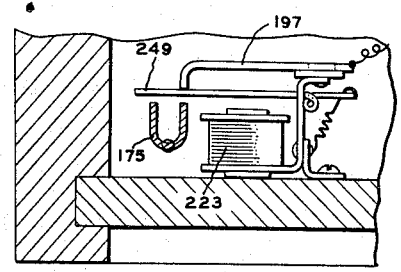
Fig. 4 is a view on the line 4—4 of Fig. 3.

Each relay 149–174 includes a contact indicated at 182–207, respectively, a coil shown at 208–233, respectively, and an extended armature shown at 234–259, respectively (Fig. 4). When any one or more of armatures 234–259 are pulled down by their respective coils 208–233 they are engaged and held down by magnet 175 and are released to return to normal position only when magnet 175 is rotated by handle 178. Rotation of handle 178 to release these armatures and to prepare the apparatus for use by another student or user acts through linkage 260 on arm 148 to return counter 146 to zero position.

Referring now to the circuit of Fig. 5 for counting correct answers, it will be seen that the circuit of Fig. 2 is incorporated therein but with wire 79 connected to buss wire 90 and with wire 74 connected to switch element 86 and to one side of coil 76. It will also be noted that for simplicity of description and of disclosure battery 72 is shown as the only source of electricity and only three push button switches 40, 41, and 42 and associated relays 149, 150 and 151 and wiring are shown. Rotary selector switch 37 is provided with a second set of contacts 261–286 which are engaged by rotary contact 287' which rotates with contact 78.

Wire 92 is connected to armature 234 and contact 182 is connected by wire 287 to contact 261. One side of coil 208 is connected by wire 288 to wire 287 and the other side of coil 208 is connected by wire 289 to resistance 290 and resistance 290 is connected by wire 291 to wire 74. Wire 93 is connected to armature 235 and contact 183 is connected by wire 292 to contact 262. One side of coil 209 is connected by wire 293 to wire 292 and the other side of coil 209 is connected by wire 294 to wire 289. Wire 94 is connected to armature 236 and contact 184 is connected by wire 295 to contact 263. One side of coil 210 is connected to wire 295 by wire 296 and the other side of coil 210 is connected by wire 297 to wire 289. Rotary contact arm 287' is connected by wire 298 to one side of solenoid 144 and the other side of solenoid 144 is connected to wire 291. One contact 299 of relay 145 normally connects to wire 298 and normally engages contact arm 300 thereof. The other contact 301 of relay 145 is connected by wire 302 to wire 291.

With the apparatus wired as above described as shown in Fig. 5, assume that selector switch 37 is set for specimen No. 5 thus placing rotary contact 78 on contact 117 and rotary contact 287' on contact 262. Push button switch 41 should then be depressed to indicate the correct description, designation or the like for specimen No. 5. If, however, the user depresses a wrong push button switch, say switch 40, then current flows from battery 72 through wire 79, red light 34, wire 80, contact 81, switch element 86 and wire 74 back to battery 72. Red light 34 is illuminated indicating an error. At the same time current passes through wire 92, armature 234, contact 182, wire 287, wire 288, coil 208, wire 289, resistance 290 and wire 291 to battery 72. Coil 208 is energized drawing armature 234 down into contact with magnet 175 where it remains until magnet 175 is rotated to clear the apparatus for another user. With the contact between armature 234 and contact 182 broken any subsequent depression of push button switch 40 will complete the circuit to red light 34 only indicating a wrong answer provided the correlating medium (rotary switch) is not rotated.

It should be noted in connection with the energization of coil 208 that the amount of current which passes before armature 234 breaks contact with contact 182 is not sufficient to energize solenoid 144.

If, on the other hand, the user selects the right description or designation for specimen No. 5 the user will depress push button switch 41. A circuit is then completed from battery 72 through wire 91 and switch 41 to wire 90, wire 79, red light 34, wire 80, contact 81, switch element 86 and wire 74 to battery 72. Red light 34 will not be illuminated, however, because at the same time the circuit is completed from battery 72 to wire 91, switch 41, wire 93, contact 117, arm 78, wire 77, coil 76 and wire 74 to battery 72. Coil 76 is energized drawing switch element 86 away from contact 81 breaking the circuit to red light 34. Switch element 86 engages contact 85 putting green light 33 and chime 36 in the circuit and the green light will illuminate and the chime will sound to indicate a correct answer.

At the same time that the green light and chime circuits are being completed current passes from wire 93 through armature 235, contact 183, wire 292, contact 262, arm 287', wire 298, solenoid 144 and wire 291 to battery 72, energizing solenoid 144 and through linkage 147 actuating counter 146 to count a correct answer. At the same time current passes from wire 292 to wire 293, coil 209, wire 294, wire 289, resistance 290, to wire 291 and battery 72 thus energizing coil 209 and drawing armature 235 away from contact 183. At this same time the core of solenoid 144 moving to the left (Fig. 5) moves arm 300 into engagement with contact 301 thus putting battery 72 temporarily in direct circuit to coil 209 keeping coil 209 energized to insure that armature 235 is drawn into engagement with magnet 175 where it is held until the apparatus is cleared for another user. With the circuit between armature 235 and contact 183 thus held open by magnet 175 any later actuation of push button switch 41 will close the circuit to green light 33 only to show a correct answer, provided the correlating medium (rotary switch) is not rotated, but this correct answer would not be scored since contact 183 is open.

The circuit of Fig. 6 is employed with the apparatus of the present invention if errors are to be counted in scoring the user of the apparatus. Fig. 6 shows a simplified circuit with only three push button switches 40, 41 and 42 illustrated and chime 36 has been omitted. It will be noted that coil 208 is connected by wire 303 to wire 92 and by wire 288 to contact 261 while contact 182 is connected directly to wire 289. The same type of hook-up is used for each of the coils 208–233 as further shown for coil 209 which is connected by wire 304 to wire 93 and by wire 293 to contact 262. Here contact 183 is directly connected to wire 289. Solenoid 144 is connected in series in wire 289 and wire 298 leads directly from arm 287 to wire 74.

In the embodiment of Fig. 6 suppose that specimen No. 9 is to be identified. Selector switch 37 is then rotated to bring number 9 opposite the index point rotating arm 78 into engagement with contact 117 and rotating arm 287' into engagement with contact 262. Push button switch 41 will then indicate a correct answer. If the user of the apparatus depresses any other of the push button switches a wrong answer will be indicated and will be counted. If, for example, the user depresses push button switch 40 the circuit to red light 34 will be completed, as described above with respect to Fig. 5 and red light 34 will be illuminated to indicate an error. At the same time current will pass through wire 92, armature 234, contact 182, wire 289, solenoid 144 and wire 291 to battery 72 energizing solenoid 144 and through linkage 147 actuating counter 146 to score an error. The circuit through coil 208 remains open and armature 234 is not brought into contact with magnet 175 so that any subsequent depression of switch 40 by the user will again score an error.

If, on the other hand, correct switch 41 is actuated by the user the circuit to green light 33 is completed as described above for Fig. 5 showing a correct answer. At the same time current passes through wire 93, wire 304, coil 209, wire 293, contact 262, arm 287' and wire 298 back to battery 72. Coil 209 is energized pulling armature 235 into contact with magnet 175 where it is held until the apparatus is cleared for the next user. Movement of armature 235 breaks contact at 183 so that solenoid 144 is not energized as errors are being counted and not correct answers.

When a user of the embodiments of Figs. 3–6 of this invention has finished his turn the apparatus is cleared for the next user by rotating crank 178 and magnet 175 to release the several armatures 234–259 to return them to their normal positions engaging contacts 182–207, respectively. At the same time rotation of magnet 175 acts through arm 260 to rotate reset lever 148 of counter 146 to return counter 146 to its zero position.

It should now be apparent to those skilled in the art that by the present invention we have provided a novel educational, recreational and testing apparatus which in every way satisfies the objectives described above.

Changes in or modifications to the above described illustrative embodiments of our invention may now be suggested without departing from the present inventive concept. Reference should therefore be had to the appended claims to determine the scope of this invention.

What is claimed is:

1. In apparatus as described, a selector switch, a manually actuable switch member for said selector switch, a plurality of contacts one of which is engaged for each position of said switch member, a plurality of manually actuable switches, a circuit for each of said second named switches connecting each switch to one of said contacts, error indicating means, a circuit connecting said error indicating means to said second named switches, electrically actuated switch means in said error indicating circuit, a source of electrical energy in said error indicating circuit and connected to said second named switches, means indicating correct answers, a normally open circuit connecting said last named means to said electrically actuated switch means and to said source of electrical energy, circuit means from said switch member to said electrically actuated switch means including said source of electrical energy, said electrically actuated switch means including a contact and a movable switch element connected in series in said circuit connecting said error indicating means to said second named switches and normally engaging said contact, a second contact engageable by said movable switch element in said circuit for said means indicating correct answers, a coil connected in series in said circuit from said manually actuable switch member to actuate said switch element, electrically actuated scoring means, a second selector switch actuable with said first selector switch and having a second plurality of contacts corresponding to said contacts of said first selector switch, a circuit from each of said switches to one of said second contacts, a circuit for said scoring means including said source of electrical energy and said second selector switch whereby said scoring means is actuated only when one of said switches is actuated for one of said units correctly identifying the specimen set by number on said selector switch.

2. Apparatus as described in claim 1 in which said second selector switch includes a switch member moveable into engagement with one of said second contacts at a time, said circuit for said scoring means connecting to said switch member.

3. Apparatus as described in claim 1 including electrically actuated means in each of said circuits from said switches to said second contacts to open each such circuit after said scoring means has been energized therethrough.

4. Apparatus as described in claim 1 including electrically actuated means in each of said circuits from said switches to said second contacts to open each such circuit after said scoring means has been energized therethrough, each of said electrically actuated means including a coil, an armature for said coil and a magnet, said coil being energized on passage of current through its circuit to move said armature to break the circuit, said magnet thereafter holding said armature in circuit open position.

5. In apparatus as described, a selector switch, a manually actuable switch member for said selector switch, a plurality of contacts one of which is engaged for each position of said switch member, a plurality of manually actuable switches, a circuit for each of said second named switches connecting its switch to one of said contacts, error indicating means, a circuit connecting said error indicating means to said second named switches, electrically actuated switch means in said error indicating circuit, a source of electrical energy in said error indicating circuit and connected to said second named switches, means indicating correct answers, a normally open circuit connecting said last named means to said electrically actuated switch means and to said source of electrical energy, circuit means from said switch member to said electrically actuated switch means including said source of electrical energy, said electrically actuated switch means including a contact and a movable switch element connected in series in said circuit connecting said error indicating means to said second named switches and normally engaging said contact, a second contact engagable by said movable switch element in said circuit for said means indicating correct answers, a coil connected in series in said circuit from said manually actuable switch member to actuate said switch element, electrically actuated error scoring means, a circuit from each of said switches to said error scoring means including said source of electrical energy, electrically actuated circuit opening means in each of said last named circuits, a second selector switch actuable with said first selector switch and having a second set of contacts corresponding to those of said first selector switch, each of said circuit opening means being connected to one of said second contacts, and a circuit connecting said second selector switch to said source of electrical energy, whereby said error counting mechanism will be energized for each of said switches actuated except that one of said switches actuated for said unit correctly identifying the specimen set by number on said selector switch.

6. Apparatus as described in claim 4 in which said second selector switch includes a switch member moveable into engagement with one of said second contacts at a time, said circuit connecting said second selector switch to said source of electrical energy including said switch member.

References Cited in the file of this patent

UNITED STATES PATENTS

| | | |
|---|---|---|
| 2,104,718 | Dougherty | Jan. 4, 1938 |
| 2,349,066 | Witter | May 16, 1944 |
| 2,690,621 | Dean | Oct. 5, 1954 |
| 2,742,713 | Villanueva | Apr. 24, 1956 |
| 2,826,828 | Hamilton | Mar. 18, 1958 |